No. 787,447. PATENTED APR. 18, 1905.
E. T. HISEY & J. W. MOORE.
SELF FEEDER FOR BALING PRESSES.
APPLICATION FILED SEPT. 17, 1904.
2 SHEETS—SHEET 1.
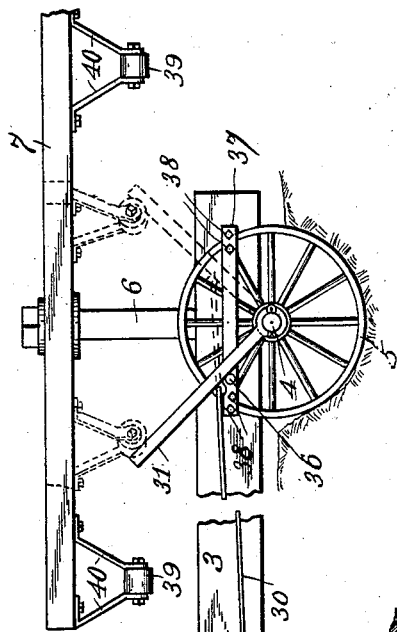
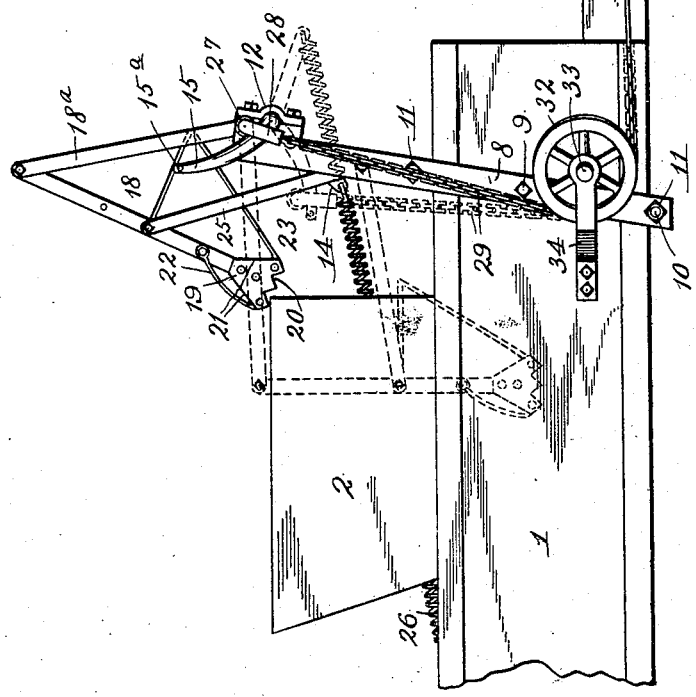
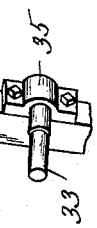
WITNESSES:
R. E. Hamilton
J. Moore
INVENTORS
E. T. Hisey and J. W. Moore
By F. G. Fischer
Atty.

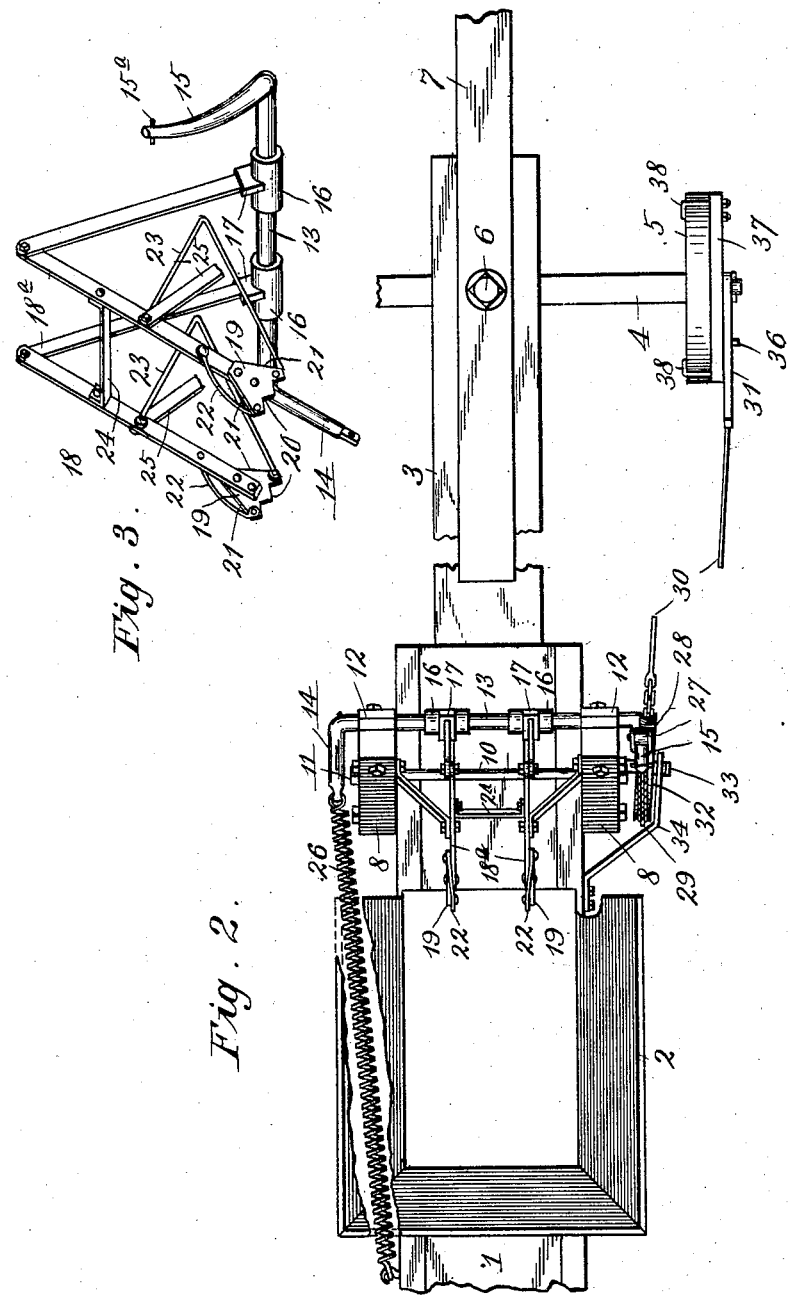

No. 787,447. Patented April 18, 1905.

UNITED STATES PATENT OFFICE.

EDWIN T. HISEY AND JAMES W. MOORE, OF BLAIRSTOWN, MISSOURI.

SELF-FEEDER FOR BALING-PRESSES.

SPECIFICATION forming part of Letters Patent No. 787,447, dated April 18, 1905.

Application filed September 17, 1904. Serial No. 224,848.

*To all whom it may concern:*

Be it known that we, EDWIN T. HISEY and JAMES W. MOORE, citizens of the United States, residing at Blairstown, in the county of Henry and State of Missouri, have invented certain new and useful Improvements in Self-Feeders for Baling-Presses, of which the following is a specification.

Our invention relates to improvements in self-feeders for baling-presses; and our object is to provide a simple and effective apparatus of this character whereby each charge of hay is automatically fed from the hopper down into the baling-chamber of the press, where it is condensed before the plunger contacts therewith.

The invention consists in the novel construction, combination, and arrangement of parts hereinafter described, and pointed out in the claims, and in order that it may be fully understood reference will now be made to the accompanying drawings, in which—

Figure 1 represents a broken side elevation of a baling-press provided with our invention. Fig. 2 is a plan view of the same. Fig. 3 is a detail perspective view of a condenser forming part of the invention. Fig. 4 is a detail perspective view showing the manner in which a stub-shaft carrying a sheave-wheel forming part of the invention is supported.

In said drawings, 1 designates a baling-chamber surmounted by a hopper 2. 3 designates a bed-plate secured at its opposite ends to the baling-chamber and a front axle 4, provided with the customary carrying-wheels 5, which are usually placed in a trench, as shown in Fig. 1, when the press is in operation. 6 designates a power-shaft journaled in the forward end of the bed-plate and provided at its upper end with a rigidly-secured sweep 7. All of these parts are in general use and form no part of the invention.

8 designates a pair of standards secured to the forward portion of the baling-chamber by centrally-disposed bolts 9 and tie-rods 10, which latter extend across the top and bottom portions of the baling-chamber and are provided at their threaded ends with taps 11, whereby the standards are drawn tightly into contact with the opposite sides of the baling-chamber. The upper ends of the standards have boxes 12, in which is mounted a transverse shaft 13, provided at one end with a straight crank-arm 14 and at its opposite end with a segmental crank-arm 15, extending substantially at right angles to arm 14. Shaft 13 has a pair of rigidly-mounted sleeves 16 located between the standards and provided with rectangular sockets 17, to which a condenser 18 is secured. Said condenser consists of a pair of toggles 18ª, the rear ends of which are rigidly secured in sockets 17, while their forward free ends are armed with triangular plates 19, having serrations 20 at their under sides, which reliably engage the charge of hay when forcing the latter downwardly into the baling-chamber. The hay is prevented from lodging on the inclined sides 21 of plates 19, and thus being withdrawn from the baling-chamber by releasing devices 22 23, respectively, the former of which are secured at their opposite ends to the forward lower corners of plates 19 and to the forward portions of the toggles a short distance above the upper ends of said plates, while the latter, which are substantially L-shaped, are secured at their opposite ends to the lower rear corners of the right-angular plates and to the forward portions of the toggles above the releasing devices 23. The free ends of the toggles are prevented from spreading apart or drawing together when condensing a charge of hay in the baling-chamber by a transverse brace 24, secured thereto.

25 designates a pair of arms substantially paralleling the rear portions of the toggles and pivotally secured at their opposite ends to the forward portions of said toggles and the standards in order to cause the forward portions of the toggles to descend in substantially an upright position, so that they will exert great compressive force upon the charge when condensing same in the baling-chamber.

The condenser is normally held in an elevated position by a retractile spring 26, attached at its opposite ends to one side of the baling-chamber and the lower terminal of arm 14.

27 designates an antifriction-roller arranged to travel upon the upper surface of arm 15 and journaled in the upper end of a depending yoke 28, extending upwardly on opposite sides of said arm.

29 designates a chain cable attached at its opposite ends to the lower portion of the yoke and one end of a rod 30, which latter is connected at its opposite end to a lever 31, fulcrumed upon one end of axle 4. The lower portion of cable 29 passes beneath a sheave-wheel 32, mounted upon a stub-shaft 33, secured at its opposite ends to a bracket 34, projecting from the adjacent side of the baling-chamber, and a bearing 35, secured to the adjacent standard 8. The forward stroke of lever 31 is limited by a stop-pin 36, projecting from a bar 37, reliably secured to the adjacent wheel 5 by stirrup-bolts 38. Lever 31 is normally held in contact with pin 36 by the tension of spring 26, so that the upper end of said lever will rest in the path of a pair of antifriction-rollers 39, journaled in the lower ends of hangers 40, depending from the under side of sweep 7. Rollers 39 are arranged equal distance at opposite sides of the power-shaft 6, so that they will contact with lever 31 and impart two strokes thereto at each revolution of the sweep.

In operation rollers 39 contact with the upper end of lever 31 and move the latter to the end of its backward stroke, causing it to pull the upper portion of cable 29 downwardly together with the yoke 28 and roller 27. The downward movement of the roller swings the free end of crank-arm 15 downwardly, so that said roller will travel toward said end and cause the condenser to descend with increasing power, so that the charge of hay will be compressed in the baling-chamber before the plunger (not shown) contacts therewith.

The outward movement of roller 27 upon crank-arm 15 is limited by a stop-pin 15ª, extending transversely through the latter, so that yoke 28 will contact therewith before the roller can leave the arm. The curvature of the latter, however, will assist in overcoming the tendency of the roller to leave the free end of the arm, as said curvature causes said end to extend substantially in a horizontal plane when the arm is drawn to the end of its downward movement.

Should spring 26 or cable 29 break, and thus fail to raise the condenser out of the path of the advancing plunger, the latter will contact with the inclined portions of the releasing devices 23, and thereby raise the condenser and permit the passage of said plunger without injury to the condenser.

From the above description it is apparent that we have produced a simple and effective self-feeder for baling-presses, and by making the condenser in the form of toggles considerable pressure will be brought to bear upon each charge of hay. A further advantage in making the condenser of toggles is that it folds up compactly when in an elevated position, and consequently does not interfere with the placing of hay in the hopper.

Having thus described our invention, what we claim, and desire to secure by Letters Patent, is—

1. In a self-feeder for baling-presses, a pair of toggles mounted adjacent to the hopper of said press, means for forcing the free ends of the toggles down through the hopper and into the baling-chamber of the press, a spring for withdrawing the toggles from the baling-chamber, and releasing devices secured to the lower rear portions of the free ends of said toggles.

2. In a self-feeder for baling-presses, a condenser consisting of a pair of toggles mounted adjacent to the hopper of the press, and releasing devices secured to the front lower portions of the toggles.

3. In a self-feeder for baling-presses, a condenser consisting of a pair of toggles mounted adjacent to the hopper of the press, releasing devices secured to the lower rear portions of the free ends of the toggles, and releasing devices secured to the lower front portions of the free ends of the toggles.

4. A self-feeder for baling-presses consisting of a pair of standards secured to the opposite sides of the baling-chamber of the press, a transverse shaft mounted in the upper ends of said standards, means for oscillating said shaft, a condenser consisting of a pair of toggles mounted upon the shaft, and releasing devices secured to the free ends of said toggles.

5. In a self-feeder for presses, a pair of standards secured to the opposite sides of the baling-chamber of the press, a condenser comprising a pair of toggles mounted in the upper ends of the standards, a pair of arms approximately paralleling the rear portions of the toggles and pivoted at their opposite ends to the front portions of the toggles and the standards, triangular plates secured to the free ends of said toggles, and releasing devices secured to said plates and to the free ends of the toggles.

6. In a self-feeder for baling-presses, standards secured to the opposite sides of the baling-chamber of the press, a transverse shaft mounted in the upper ends of said standards, a condenser mounted upon said shaft, crank-arms secured to the opposite ends of said shaft, a roller arranged to travel on one of said arms, a depending yoke in the upper end of which the roller is journaled, means for pulling downwardly on the yoke, and a spring attached at its opposite ends to the other arm and the baling-chamber.

7. In a self-feeder for baling-presses, a condenser consisting of a pair of toggles mounted adjacent to the hopper of the press, and inverted-L-shaped releasing devices secured to the lower rear portions of the free ends of said toggles.

8. A self-feeder for baling-presses consisting of a pair of standards secured to the opposite sides of the baling-chamber of the press, a transverse shaft mounted in the upper ends of the standards, crank-arms secured to the opposite ends of said shaft, a condenser mounted upon the shaft, a lever fulcrumed on one of the axles of the press, a cable adjustably secured at one end to one of the crank-arms and suitably connected at its opposite end to the lever, a sheave-wheel beneath which the cable passes, a spring connected at its opposite ends to the other crank-arm and the baling-chamber, contact devices on the sweep of the press adapted to engage the lever and move it to the end of its backward stroke, and means for limiting the forward movement of said lever.

9. A self-feeder for baling-presses consisting of a pair of standards secured to the opposite sides of the baling-chamber, a transverse shaft mounted in the upper ends of said standards, crank-arms secured to the opposite ends of the shaft, a condenser mounted upon said shaft, a lever fulcrumed on one of the axles of the press, a cable adjustably secured at one end to one of the crank-arms and suitably connected at its opposite end to the lever, a sheave-wheel beneath which the cable operates, a spring attached at its opposite ends to the other crank-arm and to the baling-chamber, rollers secured to the sweep of the press and adapted to engage the lever and move it to the end of its backward stroke, a bar secured to one of the wheels of the press adjacent to the lever, and a stop-pin projecting from said bar to limit the forward movement of the lever.

10. In a self-feeder for baling-presses, a transverse shaft mounted adjacent to the hopper of the press, a pair of sleeves rigidly mounted upon said shaft and provided with sockets, a condenser secured in said sockets, a segmental crank-arm secured to the shaft, a stop-pin secured to the free end of said crank-arm, a roller arranged to travel upon the crank-arm and depress the latter with the condenser, means for drawing said roller downwardly, and means for raising the condenser to its normal position.

In testimony whereof we affix our signatures in the presence of two witnesses.

EDWIN T. HISEY.
JAMES W. MOORE.

Witnesses:
   JUL. H. SCHWEER,
   CHAS. W. POLLOCK.